A. A. ST. CLAIR.
BRAKE RELEASE.
APPLICATION FILED NOV. 26, 1907.
899,919.
Patented Sept. 29, 1908.
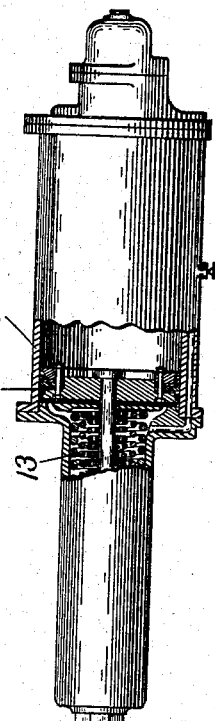
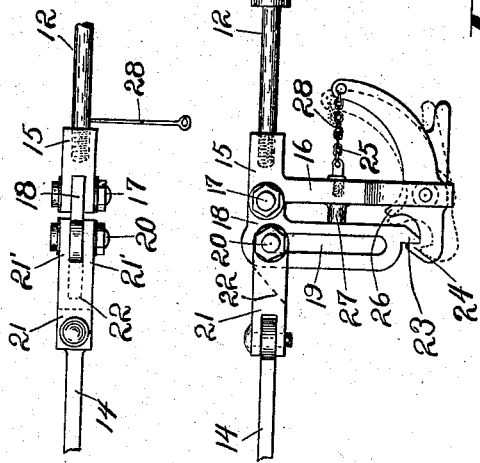
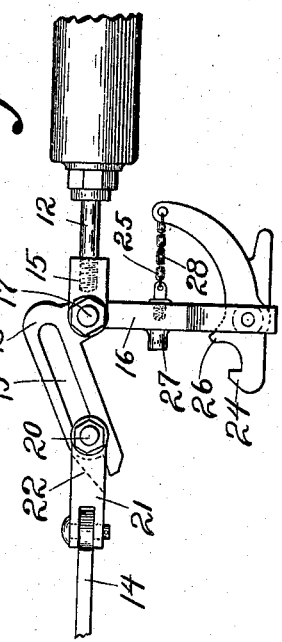
Witnesses
Karl Clendening.
Thomas W. McMeans
Inventor
Agustus A. St Clair
By
Bradford Hood
Attorneys

UNITED STATES PATENT OFFICE.

AUGUSTUS A. ST. CLAIR, OF INDIANAPOLIS, INDIANA, ASSIGNOR TO ST. CLAIR AIR BRAKE COMPANY, OF INDIANAPOLIS, INDIANA, A CORPORATION OF INDIANA.

BRAKE RELEASE.

No. 899,919.  Specification of Letters Patent.  Patented Sept. 29, 1908.

Application filed November 26, 1907. Serial No. 403,957.

*To all whom it may concern:*

Be it known that I, AUGUSTUS A. ST. CLAIR, a citizen of the United States, residing at Indianapolis, in the county of Marion and State of Indiana, have invented certain new and useful Improvements in Brake Release, of which the following is a specification.

In the use of that type of air brake illustrated in my Patent No. 860,946 a compression spring is provided for normally setting the brakes independent of any air pressure, and means is provided for counteracting this force by air pressure normally maintained from the train line but capable of being transferred, in part, so as to assist the spring in the application of the brakes. In operation of such an apparatus, if a car equipped therewith be placed upon a siding and the air pressure withdrawn, the springs will set the brakes and before the car can be moved the brakes must be either released by normal air pressure or withdrawn by hand-operated means, this being the reverse of the ordinary hand operated means now commonly provided on cars equipped with the present standard brakes.

With the present standard air brakes, such for instance as the Westinghouse and New York brakes, brakemen have grown familiar with the operation of "bleeding," which means the withdrawal of air pressure from the auxiliary reservoir to permit the release of brakes which have been set and, in order that my improved brake mechanism, of the type illustrated in the above mentioned patent, may be operated in conjunction with air brakes now commonly in use, by methods and operations practically identical with the methods and operations used in connection with the present standard brakes, the object of my present invention is to provide means by which the spring pressure may be withdrawn from the brakes thus released, the said apparatus being of such character that mechanism simulating the ordinary "bleeding" mechanism of standard air brakes is provided for its operation to release position and the construction also being such that, when air is applied to the brake-operating piston, the parts will be automatically reassembled into normal relations.

The accompanying drawings illustrate my invention.

Figure 1 is a side elevation of my improvement applied to a brake cylinder of the type already mentioned, the said brake cylinder being shown in partial vertical section; Fig. 2 is a similar view of my present improvement in brake-released position; and Fig. 3 a plan of the parts shown in Fig. 1.

In the drawings, 10 indicates the brake cylinder, 11 the piston, 12 the piston rod, 13 the springs and 14 the rod extending to the brakes. Instead of making a positive connection between the piston rod 12 and the brake rod 14, as in my before-mentioned patent, I secure, to rod 12, a head 15 having a depending finger 16. Pivoted to rod 15 at 17 is a bell-crank-lever 18 having a short horizontal arm and a longer depending arm in which is formed a substantially vertical slot 19, the upper end of which lies below pivot 17 a sufficient distance to permit the pivot pin 20 (which is adapted to traverse the slot 19) to lie below pivot 17 a short distance, in actual practice about one-quarter of an inch. Pivoted to pin 20 is a head 21 to which the brake rod 14 is connected. The head 21 is provided with ears 21' which overlap the depending arm of lever 18 and between which is a cam or inclined surface 22 (shown in dotted lines) adapted to engage the adjacent edge of the depending arm of link 18. At the lower end of the depending arm of lever 18 I provide a finger 23 adapted to be engaged by a pawl 24 pivoted in the lower end of arm 16. Pawl 24 is normally held in position by a flexible connection 25 which connects one end of said pawl with arm 16 and said pawl is provided with a finger 26 adapted to be brought into engagement with the depending arm of lever 18 in the direction opposite to that which the main portion of the pawl acts upon said arm. Secured to arm 16 is a stop 27 which limits the movement of lever 18 in one direction on head 15. Attached to the connection 25 at a point intermediate its length is a rod 28 which is extended outward to the edge of the car and at its outer end is provided with a handle. The member 28 corresponds in general appearance and location to the ordinary "bleeding valve operating member" commonly in use with standard brakes.

The operation is as follows: Under normal conditions the parts are in the positions shown in Fig. 1 where the center of pin 20 is about one-quarter of an inch lower than the center of pin 17, and finger 23 of the long arm of lever 18 lies behind pawl 24, so that rods 12 and 14 are connected rigidly together. If the air pressure be withdrawn from cylinder 10 however, spring 13 tends to draw the entire mechanism toward the cylinder and set the brakes by a pull upon rod 12. In order to release the brakes the operator pulls upon rod 28 so as to draw pawl 24 away from finger 23 and cause finger 26 of pawl 24 to engage the long arm of lever 18 and swing the same outward so that it will be given a start on its movement upward, whereupon the pull exerted by spring 13 will draw rod 12 and head 15 to the right and the lever 18 will swing to the position shown in Fig. 2 without exerting a pull upon the rod 14. As soon as air pressure is restored in the right hand end of cylinder 10, however, piston 11 will move to the left, carrying head 15 with it, and causing the long arm of lever 18 to engage the cam surface 22 and be thrown downward by it until the finger 23 passes in behind pawl 24, so that the parts are thus automatically restored to normal.

I claim as my invention:

1. The combination of a piston rod, a brake rod, an intermediate extensible normally retained connection between said rods, and means dependent upon the bringing together of the rods for automatically restoring the connection to normal.

2. The combination of a piston rod, a brake rod, an intermediate extensible normally retained connection between said rods, means dependent upon the bringing together of the rods for automatically restoring the connection to normal, and means for normally holding the connection in normal relationship.

3. The combination of a brake rod, a piston rod, a pivoted member carried by one of said rods, a sliding connection between said member and the other rod, and means carried by said other rod for engaging the pivoted member to restore the pivoted member to normal by bringing the two rods together.

4. The combination of a brake rod, a piston rod, a pivoted member carried by one of said rods, a sliding connection between said member and the other rod, means carried by said other rod for engaging the pivoted member to restore the pivoted member to normal by bringing the two rods together, and means for normally holding the pivoted member in normal position.

5. The combination of a brake-rod, a piston rod, a bell-crank lever with one arm pivoted to one of said rods, a sliding connection between the other arm of said lever and the other rod, and means for forcing the lever down by bringing the rods together.

6. The combination of a brake-rod, a piston rod, a bell-crank-lever with one arm pivoted to one of said rods and having its other arm normally depending, and a sliding connection between the depending arm of said lever and the other rod said sliding connection lying above the pivotal connection of the lever and first rod when the lever is in normal position.

7. The combination of a brake-rod, a piston rod, a bell-crank-lever with one arm pivoted to one of said rods and having its other arm normally depending, a sliding connection between the depending arm of said lever and the other rod said sliding connection lying above the pivotal connection of the lever and first rod when the lever is in normal position, and means for swinging the lever upwards.

8. The combination of a brake-rod, a piston rod, a bell-crank-lever with one arm pivoted to one of said rods and having its other arm normally depending, a sliding connection between the depending arm of said lever and the other rod said sliding connection lying above the pivotal connection of the lever and first rod when the lever is in normal position, and means for forcing the lever down by bringing the rods together.

9. The combination of a brake-rod, a piston rod, a bell-crank-lever with one arm pivoted to one of said rods and having its other arm normally depending, a sliding connection between the depending arm of said lever and the other rod said sliding connection lying above the pivotal connection of the lever and first rod when the lever is in normal position, means for swinging the lever upwards, and means for forcing the lever down by bringing the rods together.

10. The combination of a brake-rod, a piston rod, a bell-crank-lever with one arm pivoted to one of said rods, a sliding connection between the other arm of said lever and the other rod, means for forcing the lever down by bringing the rods together, and means for locking the lever in normal position.

11. The combination of a brake-rod, a piston rod, a bell-crank-lever with one arm pivoted to one of said rods and having its other arm normally depending, a sliding connection between the depending arm of said lever and the other rod said sliding connection lying below the pivotal connection of the lever and first rod when the lever is in normal position, and means for locking the lever in normal position.

12. The combination of a brake-rod, a piston rod, a bell-crank-lever with one arm pivoted to one of said rods and having its other arm normally depending, a sliding connection between the depending arm of said lever and the other rod said sliding connection lying below the pivotal connection of the lever and first rod when the lever is in normal position, means for swinging the lever upwards, and means for locking the lever in normal position.

13. The combination of a brake-rod, a piston rod, a bell-crank-lever with one arm pivoted to one of said rods and having its other arm normally depending, a sliding connection between the depending arm of said lever and the other rod said sliding connection lying below the pivotal connection of the lever and first rod when the lever is in normal position, means for forcing the lever down by bringing the rods together, and means for locking the lever in normal position.

14. The combination of a brake-rod, a piston rod, a bell-crank-lever with one arm pivoted to one of said rods and having its other arm normally depending, a sliding connection between the depending arm of said lever and the other rod said sliding connection lying below the pivotal connection of the lever and first rod when the lever is in normal position, means for swinging the lever upwards, means for forcing the lever down by bringing the rods together, and means for locking the lever in normal position.

15. The combination of a brake-rod, a piston rod, a bell-crank-lever with one arm pivoted to one of said rods, a sliding connection between the other arm of said lever and the other rod, means for forcing the lever down by bringing the rods together, a movable lock-member provided with means for engaging and normally holding said lever, and also with means for starting said lever toward abnormal position.

16. The combination of a brake-rod, a piston rod, a bell-crank-lever with one arm pivoted to one of said rods and having its other arm normally depending, a sliding connection between the depending arm of said lever and the other rod said sliding connection lying below the pivotal connection of the lever and first rod when the lever is in normal position, a movable lock-member provided with means for engaging and normally holding said lever, and also with means for starting said lever toward abnormal position.

17. The combination of a brake-rod, a piston rod, a bell-crank-lever with one arm pivoted to one of said rods and having its other arm normally depending, a sliding connection between the depending arm of said lever and the other rod said sliding connection lying below the pivotal connection of the lever and first rod when the lever is in normal position, means for swinging the lever upwards, means for forcing the lever down by bringing the rods together, a movable lock-member provided with means for engaging and normally holding said lever, and also with means for starting said lever toward abnormal position.

In witness whereof, I, have hereunto set my hand and seal at Indianapolis, Indiana, this 20th day of November, A. D. one thousand nine hundred and seven.

AUGUSTUS A. ST. CLAIR. [L. S.]

Witnesses:
FRANK A. FAHLE,
ARTHUR M. HOOD.